(12) United States Patent
Montaron

(10) Patent No.: US 8,928,322 B2
(45) Date of Patent: Jan. 6, 2015

(54) METHOD AND APPARATUS FOR DETERMINING FORMATION WATER SATURATION DURING DRILLING

(75) Inventor: Bernard Montaron, Saint-Marcel Pauiel (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 975 days.

(21) Appl. No.: 13/060,188

(22) PCT Filed: Aug. 4, 2009

(86) PCT No.: PCT/EP2009/005714
§ 371 (c)(1),
(2), (4) Date: Nov. 7, 2011

(87) PCT Pub. No.: WO2010/022851
PCT Pub. Date: Mar. 4, 2010

(65) Prior Publication Data
US 2012/0043966 A1    Feb. 23, 2012

Related U.S. Application Data

(60) Provisional application No. 61/091,978, filed on Aug. 26, 2008.

(51) Int. Cl.
| | | |
|---|---|---|
| G01V 3/18 | (2006.01) | |
| G01V 5/10 | (2006.01) | |
| G01V 11/00 | (2006.01) | |
| E21B 49/08 | (2006.01) | |

(52) U.S. Cl.
CPC .............. *G01V 5/104* (2013.01); *G01V 11/00* (2013.01); *G01V 3/18* (2013.01); *E21B 49/08* (2013.01)

USPC ..... 324/324; 324/341; 73/152.08; 73/152.06; 73/152.41; 73/152.42; 73/152.19; 73/152.01; 73/866

(58) Field of Classification Search
CPC ........... G01V 11/00; G01V 3/18; E21B 49/08
USPC .................. 324/341, 324; 73/152.08, 152.06, 73/152.41, 152.42, 152.19, 152.01, 866
See application file for complete search history.

(56) References Cited

U.S. PATENT DOCUMENTS 2,562,992 A * 8/1951 Schlumberger ............... 324/366
3,255,353 A * 6/1966 Scherbatskoy ................ 250/254

(Continued)

FOREIGN PATENT DOCUMENTS

| EP | 1729151 | 6/2011 |
| RU | 2232409 | 7/2004 |
| WO | 2005/106190 | 11/2005 |

OTHER PUBLICATIONS handran et al., "Waterflood Saturation Measurement with Carbon-Oxygen Tools in a Middle-East Carbonate", Abu Dhabi International Petroleum Exhibition & Conference, Oct. 13-16, 2002, p. 1-13.*

(Continued)

*Primary Examiner* — Patrick Assouad
*Assistant Examiner* — Lamarr Brown
(74) *Attorney, Agent, or Firm* — Stephanie Chi; Wesley Noah

(57) ABSTRACT

A method for determining water saturation in a subsurface formation include determining an invasion depth in the formation from a plurality of measurements made within a wellbore drilled through the formation. The measurements have different lateral depths of investigation into the formation. Carbon and oxygen in the formation are measured at substantially a same longitudinal position as at a position of the determining the invasion depth. The measured carbon and oxygen and the invasion depth are used to determine the water saturation in a substantially uninvaded part of the formation.

20 Claims, 3 Drawing Sheets

(56) References Cited

U.S. PATENT DOCUMENTS

| | | | |
|---|---|---|---|
| 3,638,484 | A | 2/1972 | Tixier |
| 3,780,302 | A * | 12/1973 | Arnold et al. ............... 250/301 |
| 4,786,874 | A * | 11/1988 | Grosso et al. ............ 340/853.4 |
| 4,968,940 | A | 11/1990 | Clark et al. |
| 5,045,693 | A | 9/1991 | McKeon et al. |
| 5,055,676 | A | 10/1991 | Roscoe et al. |
| 5,808,298 | A | 9/1998 | Mickael |
| RE36,012 | E * | 12/1998 | Loomis et al. ............ 250/269.4 |
| 5,883,515 | A * | 3/1999 | Strack et al. ................. 324/339 |
| 6,047,784 | A | 4/2000 | Dorel |
| 6,465,775 | B2 * | 10/2002 | Mullins et al. ............ 250/269.1 |
| 6,648,083 | B2 * | 11/2003 | Evans et al. ..................... 175/41 |
| 6,703,606 | B2 | 3/2004 | Adolph |
| 6,705,413 | B1 | 3/2004 | Tessari |
| 6,944,548 | B2 * | 9/2005 | Radtke et al. ..................... 702/8 |
| 7,028,789 | B2 | 4/2006 | Krueger et al. |
| 7,112,783 | B2 | 9/2006 | Ellis et al. |
| 7,461,547 | B2 * | 12/2008 | Terabayashi et al. ...... 73/152.55 |
| 2002/0096363 | A1 * | 7/2002 | Evans et al. ..................... 175/41 |
| 2002/0193004 | A1 | 12/2002 | Boyle et al. |
| 2004/0039466 | A1 * | 2/2004 | Lilly et al. ..................... 700/95 |
| 2004/0222019 | A1 * | 11/2004 | Estes et al. ..................... 175/45 |
| 2005/0088181 | A1 * | 4/2005 | Barber et al. ................. 324/346 |
| 2005/0115716 | A1 * | 6/2005 | Ciglenec et al. ............. 166/373 |
| 2007/0112518 | A1 * | 5/2007 | Montaron ......................... 702/1 |
| 2007/0276639 | A1 * | 11/2007 | Montaron et al. ............. 703/10 |

OTHER PUBLICATIONS

Werovszky et al., "Case Study of Integrated Solutions Used to Locate and Extract Bypassed Hydrocarbons in the Mature Reservoirs of the Algyo Field, Hungary", Offshore Europe 2005 held in Aberdeen, Scotland, U.K., Sep. 6-9, 2005, p. 1-10.*

G.E. Archie, "Electrical Resistivity Log as an Aid in Determining Some Reservoir Characteristics," AIME Trans. 146, 1942, pp. 54-62.

Jay Tittman, "Neutron-excited gamma-ray spectra," Geophysical Well Logging, 1986, 2.6.1, pp. 43-49.

J. Hemmingway et al. "Introduction of enhanced carbon-oxygen logging for multi-well reservoir evaluation," SPWLA 40 Annual Logging symposium, May 30-Jun. 1999, p. 1-14.

T.J. Neville, et al, "A new-generation LWD tool with colocated sensors opens new opportunities for formation evaluation," SPE Reservoir Evaluation & Engineering, Apr. 2007, pp. 132-139.

International Search Report for the equivalent PCT patent application No. PCT/EP2009/005714 issued on Feb. 2, 2011.

Decision of grant for the equivalent Russian patent application No. 2011111290 issued on Jul. 4, 2013.

Office action for the equivalent Chinese patent application No. 200980137086.X issued on Feb. 20, 2014.

* cited by examiner

METHOD AND APPARATUS FOR DETERMINING FORMATION WATER SATURATION DURING DRILLING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of petrophysical evaluation of subsurface rock formations. More specifically, the invention relates to methods and apparatus for quantitative determination of fluid saturation in pore spaces of rock formations based other than on electrical resistivity measurements of the formations.

2. Background Art

Porous subsurface rock formations are penetrated by wellbores for the purpose of extracting fluids from the pore spaces of such formations. In particular, oil and gas are extracted using such wellbores. It is important for economic reasons to determine what fractional volume of the pore spaces of penetrated formations are occupied by oil and/or gas prior to completion of construction of a wellbore. Methods known in the art for determining fractional volume of pore space occupied by connate water and by oil and/or gas are principally based on measurements of the electrical resistivity of the rock formations. In evaluating subsurface formations, a determined quantity is the fractional volume of pore space occupied by water (called "water saturation" and represented by $S_w$), wherein it is assumed that the non-water occupied pore space contains oil and/or gas.

Most techniques for determining water saturation from measurements of rock formation resistivity are based on research performed in the 1940s. See, Archie, G. E., *Electrical Resistivity Log as an Aid in Determining Some Reservoir Characteristics*, AIME Trans. 146, 1942, p. 54-62.

A relationship between the resistivity $R_t$ of the porous rock to the connate water resistivity $R_w$, water saturation $S_w$ and fractional volume of rock occupied by pore space ("porosity") $\phi$ determined by Archie (see above) is $$R_t = \frac{R_w}{S_w^n \phi^m}$$

The foregoing relationship has proven to be accurate for many formations that constitute hydrocarbon reservoirs. For water-wet rock formations, the exponents n and m of the Archie relationship above are generally both close to 2. The stability of these exponents in the case of water-wet formations has enabled making reasonably accurate reserves estimates for new reservoirs directly from resistivity and porosity measurements made from within wellbores ("well logs"). For sandstone rocks containing clay modified formulas are known to correct for the conductivity of clay.

It has been observed, in particular in limestone/dolomite rock formations (collectively "carbonates"), that the value of the foregoing exponents can vary quite significantly with respect to depth even within the same geologic rock formation. This is due to natural heterogeneities in carbonates, e.g., rock mineral composition and rock pore structure changes, wettability changes, etc.

Furthermore, if the formation being evaluated has been invaded with, for example, the liquid phase of fluid ("drilling mud") used to drill the wellbore, the connate water originally in place in the pore spaces becomes mixed with varying amounts of the drilling fluid liquid ("mud filtrate"), and the salinity of the water in the pore spaces becomes difficult or impossible to determine using only resistivity measurements. Archie-formula derived water saturation values are therefore considered to be unreliable in many carbonate formations.

Other methods known in the art for determining water saturation include measurement of formation dielectric constant, nuclear magnetic resonance relaxation times and distributions thereof, neutron capture cross section and carbon/oxygen ratio. The foregoing measurements are generally limited in lateral depth into the formation from the wellbore wall of a few inches. As a result, at the time such instruments are inserted into the wellbore for measurements (typically after withdrawal of drilling tools and insertion therein on an armored electrical cable) the zones of measurement of the foregoing are generally completely invaded by mud filtrate, and the water saturation measurement does not reflect the oil and/or gas contained in the uninvaded rock.

Among the foregoing measurements the laterally deepest is neutron capture cross section. Such measurement is the most likely of the foregoing not be affected by mud filtrate invasion if the measurement is made while drilling of the wellbore. An instrument known by the trademark ECOSCOPE 6, which is a mark of the assignee of the present invention, is coupled within a drill string and provides neutron capture cross section measurements while drilling a wellbore. In many cases mud filtrate invasion is limited during drilling to less than the lateral depth of investigation of the various sensors on the ECOSCOPE instrument, which can thus provide measurements related to the concentration of chlorine in the rock formation. If the connate formation water salinity is known, the neutron capture cross section measurements can be directly used to determine Sw. However, the foregoing is not applicable to rock formations having low salinity (i.e. less than about 50,000 parts per million ["kppm"] sodium chloride concentration) connate water, and the foregoing instrument does not solve the challenge of invaded zones having unknown water salinity.

There continues to be a need for well logging techniques that can quantitatively determine water saturation in formations where the applicability of the Archie relationship is limited.

SUMMARY OF THE INVENTION

A method for determining water saturation in a subsurface formation include determining an invasion depth in the formation from a plurality of measurements made within a wellbore drilled through the formation. The measurements have different lateral depths of investigation into the formation. Carbon and oxygen in the formation are measured at a substantially a same longitudinal position as at a position of the determining the invasion depth. The measured carbon and oxygen and the invasion depth are used to determine the water saturation in a substantially uninvaded part of the formation.

In one example, the method includes repeating the determining invasion depth, measuring carbon and oxygen, and determining water saturation after a selected time, and characterizing a relationship between electrical resistivity and water saturation based on changes in the invasion depth and water saturation.

A well logging instrument according to another aspect of the invention includes a housing configured to be coupled within a drill string. A pulsed neutron source is disposed within the housing and is configured to irradiate formations adjacent to a wellbore when the housing is disposed therein. A plurality of radiation detectors is disposed in the housing. The detectors are configured to detect radiation from the formations resulting from interaction of neutrons from the source with the formations. The radiation detectors are configured to detect radiation related to at least thermal neutron capture cross section to at least two different lateral depths into the formations from the wellbore, and carbon and oxygen concentrations in the formations. The instrument includes a resistivity sensor associated with the housing and configured to measure resistivity of the formations to at least two different lateral depths into the formations from the wellbore.

In one example, the resistivity sensors and the radiation detectors are designed to have the same range of "depth of investigation" i.e. they make measurements in the same volume of rock.

Other aspects and advantages of the invention will be apparent from the following description and the appended claims.

DETAILED DESCRIPTION

Figure 1:
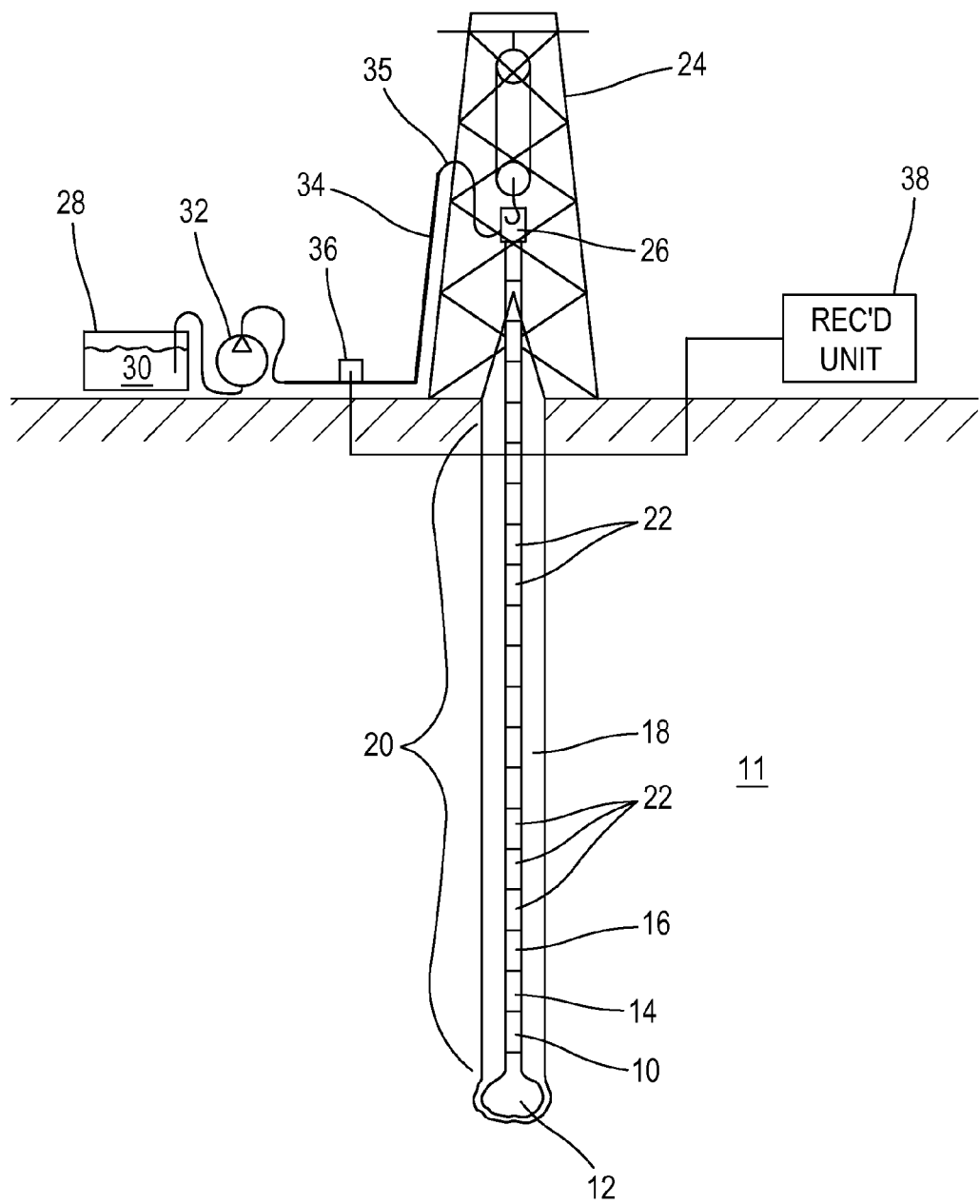
FIG. 1 shows an example of a wellbore drilling system including an instrument according to the invention.

In FIG. 1, a drilling rig 24 or similar lifting device suspends a conduit called a "drill string 20" within a wellbore 18 being drilled through subsurface rock formations, shown generally at 11. The drill string 20 may be assembled by threadedly coupling together end to end a number of segments ("joints") 22 of drill pipe. The drill string 20 may include a drill bit 12 at its lower end. When the drill bit 12 is axially urged into the formations 11 at the bottom of the wellbore 18 and when it is rotated by equipment (e.g., by a top drive 26) on the drilling rig 24, or by a motor in the drill string (not shown) such urging and rotation causes the bit 12 to axially extend ("deepen") the wellbore 18. The lower end of the drill string 20 may include, at a selected position above and proximate to the drill bit 12, a formation evaluation sub 10 according to various aspects of the invention and which will be further explained below. Proximate its lower end of the drill string 20 may also include an MWD instrument 14 and a telemetry unit 16 of types well known in the art. At least part of the power to operate the MWD instrument 14 and telemetry unit 16 may be obtained from movement of drilling fluid through the drill string 20 as explained below. The telemetry unit 16 is configured to transmit some or all of the measurements made by various sensors (explained below) the formation evaluation sub 10 and the MWD instrument 14 to the surface for decoding and interpretation.

During drilling of the wellbore 18, a pump 32 lifts drilling fluid ("mud") 30 from a tank 28 or pit and discharges the mud 30 under pressure through a standpipe 34 and flexible conduit or hose 35, through the top drive 26 and into an interior passage (not shown separately in FIG. 1) inside the drill string 20. The mud 30 exits the drill string 20 through courses or nozzles (not shown separately) in the drill bit 12, where it then cools and lubricates the drill bit 12 and lifts drill cuttings generated by the drill bit 12 to the Earth's surface.

Some examples of the telemetry unit 16 may include a telemetry transmitter (not shown separately) that modulates the flow of the mud 30 through the drill string 20. Such modulation may cause pressure variations in the mud 30 that can be detected at the Earth's surface by one or more pressure transducers 36 in pressure communication with the interior of the drill string 20 at selected positions between the outlet of the pump 32 and the top drive 26. Signals from the transducer 36, which may be electrical and/or optical signals, for example, may be conducted to a recording unit 38 for decoding and interpretation using techniques well known in the art. The decoded signals typically correspond to measurements made by one or more of the sensors (not shown) in the MWD instrument 14 and the formation evaluation sub 10.

It will be appreciated by those skilled in the art that the top drive 26 may be substituted in other examples by a swivel, kelly, kelly bushing and rotary table (none shown in FIG. 1) for rotating the drill string 20 while providing a pressure sealed passage through the drill string 20 for the mud 30. Accordingly, the invention is not limited in scope to use with top drive drilling systems.

It is also to be understood that the telemetry unit 16 may be additionally or alternatively configured to impart signals to a communication channel in a so-called "wired" drill pipe. A non-limiting example of a wired drill pipe is described in U.S. Patent Application No. 2002/0193004 filed by Boyle et al. the underlying patent application for which is assigned to the assignee of the present invention. It is also known in the art to provide electromagnetic telemetry to communicate instrument measurements from within the wellbore to the Earth's surface, and vice versa. Accordingly, the type of telemetry used in any example is not a limitation on the scope of this invention.

It should also be understood that the manner of conveyance of the formation evaluation sub 10 shown in FIG. 1 is only one possible example. Other examples may include casing drilling, for example as shown in U.S. Pat. No. 6,705,413 issued to Tessari. It is also possible to conduct drilling operations using a formation evaluation sub by conveying drilling devices into a wellbore using coiled tubing. See, for example, U.S. Pat. No. 7,028,789 issued to Krueger et al. and U.S. Pat. No. 6,047,784 issued to Dorel and assigned to the assignee of the present invention. Accordingly, the invention is not limited in scope to using threadedly coupled drill pipe to drill a wellbore and to convey the instrumentation along the well as shown in FIG. 1.

Figure 2:
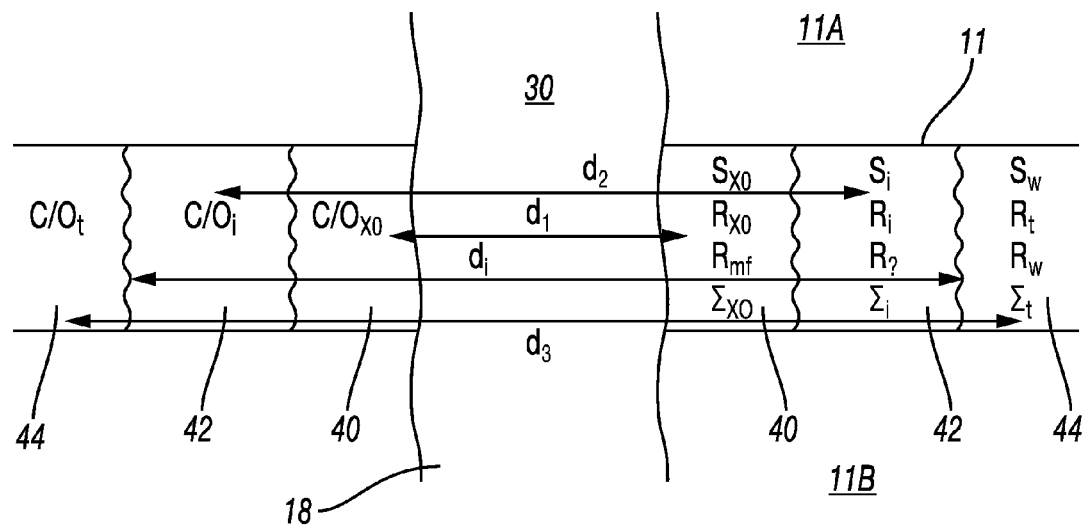
FIG. 2 shows a cross section of an invaded permeable formation to identify the various fluid saturated zones laterally adjacent to the wellbore wall.

As will be appreciated by those skilled in the art, and referring now to FIG. 2, during drilling of the wellbore 18, when a permeable formation 11 is penetrated by the drill bit (12 in FIG. 1), the liquid phase of the drilling fluid 30 in the wellbore 18, called "mud filtrate" will enter the pore spaces of the formation 11 and will displace some of the connate fluids in the pore spaces. The fluids actually displaced and the extent to which they are displaced will depend on the relative mobility of the fluids in the pore spaces, the differential fluid pressure between the wellbore 18 and the formation 11, and the degree to which solids in the drilling fluid 30 form a filter cake (not shown) on the wall of the wellbore 18 adjacent the permeable formation 11. Formations above 11A and below 11B the permeable formation 11 are illustrated in FIG. 2 as being impermeable, such as "shale" and are for purposes of the present invention are unaffected by the drilling fluid 30. The illustration in FIG. 2 is only meant to describe in general terms the various zones laterally disposed about the wellbore in a permeable rock formation, therefore, the formation evaluation sub is not shown for clarity of the illustration. The various zones shown in FIG. 2 exist essentially immediately after penetration of a permeable formation by the drill bit (12 in FIG. 1); the spatial distribution of the various zones changing over time as more fluid enters the formation from the wellbore (provided that the fluid pressure in the wellbore is greater than the fluid pressure in the pore spaces of the rock formation.

It is generally believed that laterally adjacent the wellbore 18, in a zone referred to as the "flushed zone" 40, substantially all the connate water in the formation 11 is replaced by the liquid phase of the drilling fluid if the liquid phase thereof is water-based, and substantially all mobile hydrocarbons (oil and/or gas) are fully displaced from the pore spaces of the formation 11. At a particular lateral distance ("depth") from the wellbore wall and beyond, shown at $d_i$, substantially no displacement of connate fluids occurs. The zone laterally beyond $d_i$ is referred to as the "uninvaded zone" 44. It is the uninvaded zone for which water saturation (the fractional volume of pore space occupied by water) is desired to be determined, because the water saturation is indicative of the volume of oil and/or gas present in the formation 11. It is generally understood that the hydrocarbon saturation (gas, oil and mixtures thereof is equal to unity less the water saturation ($S_h=1-S_w$. A zone between the flushed zone 40 and the uninvaded zone 44 is referred to as the invaded zone 42, in which an indeterminate amount of connate fluid has been displaced by the mud filtrate.

Quantities of interest in the uninvaded zone include the water saturation $S_w$ as mentioned above, and further include the porosity $\phi$, the electrical resistivity $R_t$, the connate water resistivity $R_w$, the element capture spectroscopy (ECS) for various elements including carbon (C), oxygen (O), Chlorine (Cl), and the thermal neutron capture cross section $\Sigma_t$. Corresponding quantities can be defined for the invaded zone (all with subscript "1") and the flushed zone (all with subscript "xo" except for the mud filtrate which is designated by subscript "mf"). The fractional volume of pore space ("porosity"–$\phi$) in the rock formation is assumed to be substantially the same in each of the foregoing zones 40, 42, 44. As explained in the Background section herein, determination of $S_w$ using resistivity based methods requires determination of $R_w$ and some knowledge of or assumptions about the Archie exponents m and n because they characterize the relationship between the resistivity of the rock formation and the resistivity of the fluid in the pore spaces of the rock formation. Measurements made by certain shallow (in the lateral dimension) investigating instruments that are responsive to the water resistivity or salinity may be substantially affected by the presence of mud filtrate ($R_{mf}$) because of its electrical resistivity, its salinity and/or its chemical composition, and thus may not be useful for determining $R_w$. Shallow measurements of thermal neutron capture cross section, for example, are sensitive to fluid salinity and require the accurate knowledge of water salinity to determine saturation.

In one example of using a method according to the invention, a first set of measurements using the formation evaluation sub (10 in FIG. 1) may be made "during drilling." As used herein, "during drilling" means that the sub (10 in FIG. 1) is moved past the formation 11 to make measurements for the first time as soon as the drill bit (12 in FIG. 1) lengthens the wellbore (18 in FIG. 1) enough to enable such movement. As will be appreciated by those skilled in the art, it is expected that moving the sub (10 in FIG. 1) for the first time past such recently drilled formation will result in as small as practical an amount of mud filtrate being displaced into the formation, so that the invaded zone is laterally relatively shallow (small $d_i$), as contrasted with the situation that will typically exist later in the wellbore drilling process, that is, much deeper fluid invasion.

Figure 3:
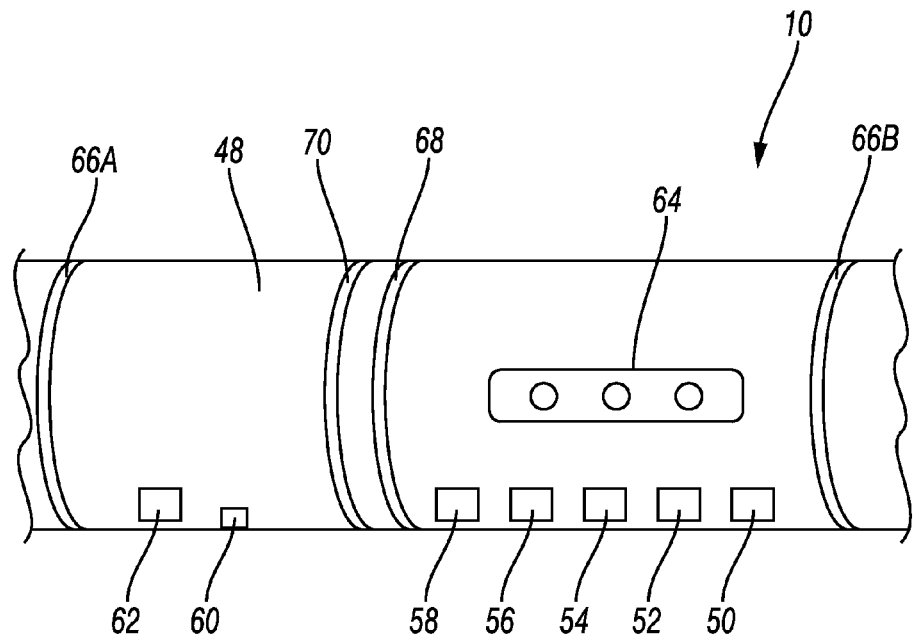
FIG. 3 shows in more detail an example formation evaluation sub from the system of FIG. 1.

An example of the formation evaluation sub (10 in FIG. 1) will now be explained in more detail with reference to FIG. 3. The sub 10 may have its functional components disposed in a substantially cylindrical drill collar 48 or similar drill string component configured to couple in the drill string (20 in FIG. 1). Typically the drill collar 48 will be made from a high strength, non-magnetic alloy such as stainless steel, monel or an alloy sold under the trademark INCONEL, which is a registered trademark of Huntington Alloys Corporation, Huntington, W. Va. The drill collar 48 may include at suitable locations and in suitable enclosures therein a pulsed neutron source 50, and a neutron monitor detector 52 that is configured to respond primarily to neutrons generated by the source 50. The pulsed neutron source 50 is configured to emit controlled duration bursts of high energy neutrons and can be the same as the one used in the ECOSCOPE instrument identified elsewhere herein and described in U.S. Reissue Pat. No. 36,012 issued to Loomis et al. and assigned to the assignee of the present invention. A plurality of longitudinally spaced apart neutron and/or gamma ray detectors 54, 56, 58 are configured to measure neutrons and/or gamma rays resulting from interaction of the neutrons from the source 50 with the formations (11 in FIG. 2) adjacent to the wellbore wall. Measurements from the monitor detector 52 may be used to normalize counting rates from the other detectors 54, 56, 58 for any changes in the output rate and/or neutron energy level of the neutron source 50.

The sub 10 may include a caliper 60 such as an acoustic travel time caliper for measuring a distance between the sub 10 wall and the wellbore wall, and a spectral gamma ray detector 62 for measuring gamma rays naturally emanating from the rock formations. The foregoing components are in substantial part described in U.S. Reissue Pat. No. 36,012 issued to Loomis et al. and assigned to the assignee of the present invention. As described in the foregoing reissue patent, the neutron source and neutron/gamma ray detectors may be configured to provide measurements corresponding to bulk density of the formation, neutron porosity of the formation (related to hydrogen concentration within the formation), and to concentration of various chemical elements in the formation. The latter analyses are provided by spectral analysis of detected gamma rays resulting from inelastic collisions of high energy neutrons with certain nuclei in the rock formations, and from neutron slowing down length and/or thermal neutron capture cross section provided by analysis of detected "capture" gamma rays. Others of the detectors, or the same detectors may be configured to measure photoelectric effect resulting from interaction of neutron activation gamma rays with formation materials. Others of the detectors, or the same detectors, may be configured to detect Compton-scattered gamma rays (originating from inelastic collisions of the neutrons from the source) in order to determine bulk density of the formation. The foregoing measurements are commercially available by using the above-mentioned ECOSCOPE instrument, and in the present example, the sub 10 may include the foregoing components of the ECOSCOPE instrument. In the present example, the arrangement of detectors 54, 56, 58 may be such that it is possible to determine formation thermal neutron capture cross section to plurality (three in the present example, labelled as $d_1$, $d_2$ and $d_3$ on FIG. 2) different lateral depths in the formation from the wellbore wall. For example, some of the detectors may be configured to detected gamma rays emanating from the formation as a result of nuclear capture of thermal neutrons.

In the present example, at least one of the detectors, for example, the one shown at 58, may be a scintillation counter gamma ray detector coupled to a multichannel pulse height analyzer (not shown for clarity) to analyze counting rate and energy level of detected gamma rays, in particular gamma rays emanating from collisions of high energy neutrons with atomic nuclei in the formation. Such gamma rays may contain information concerning the relative concentrations of carbon atoms and oxygen atoms in the formation, and such concentrations may be related to the fractional volume of pore space occupied by water and that occupied by oil and/or gas. The principles of operation of such detectors and methods for determining carbon and oxygen concentrations are described, for example, in U.S. Pat. No. 6,703,606 issued to Adolph and assigned to the assignee of the present invention. As will be further explained below, one purpose of having such components in the sub 10 and providing the sub with such measurement capability is to be able to directly determine water saturation in one or more of the zones (e.g., 40, 42, 44 in FIG. 2) without the need to determine resistivity of the water in the pore spaces, or the Archie exponents referred to in the Background section herein.

In the present example, the sub 10 may include a plurality of focused galvanic resistivity sensors, shown collectively at 64. The resistivity sensors 64 are configured to make electrical resistivity measurements proximate the wall of the wellbore and to a plurality of approximately defined, different lateral depths from the wellbore. The components in the resistivity sensors 64 are commercially available in an instrument known by the trademark GEOVISION, which is a trademark of the assignee of the present invention. The GEOVISION instrument may also include sensors (not shown) for making measurements of formation resistivity proximate the drill bit (12 in FIG. 1), and such sensors may be used in some examples. The structure of electrodes and associated circuitry that may be used in some examples is described in U.S. Pat. No. 6,373,254 issued to Dion et al. and assigned to the assignee of the present invention.

The sub 10 may include electromagnetic transmitter antennas 66A, 66B and electromagnetic receiver antennas 70, 72 disposed on the outer surface of the collar 48 to make measurements of electromagnetic propagation resistivity to a greater lateral depth in the formation (in some cases into the uninvaded zone 44 in FIG. 2). Internal components coupled to the foregoing antennas may be similar to those of a well logging device for making such measurements as described in U.S. Pat. No. 4,968,940 issued to Clark et al. and assigned to the assignee of the present invention.

The above source 50 and detectors 52 through 58, caliper 60 and sensors 64 and antennas 66A, 66B, 70, 72 may be coupled to suitable electrical power source, signal conditioning and signal communications devices as would occur to those skilled in the art. The foregoing may be made according to structures well known in the art and are not shown in FIG. 3 for clarity of the illustration.

It is desirable for the detectors and sensors on the sub 10 to be responsive to approximately the same (although not necessarily exactly the same) longitudinal span along the drill string (20 in FIG. 1). More specifically, it is desirable that the depth of invasion is substantially the same for each of the different measurements. Such configuration is possible, for example, by distributing the various sensors around the circumference of the collar 48 at substantially the same longitudinal position. By so configuring the sensors and detectors, it is expected that the invasion diameter will be substantially the same for all the measurements made as will be explained below.

Figure 4:
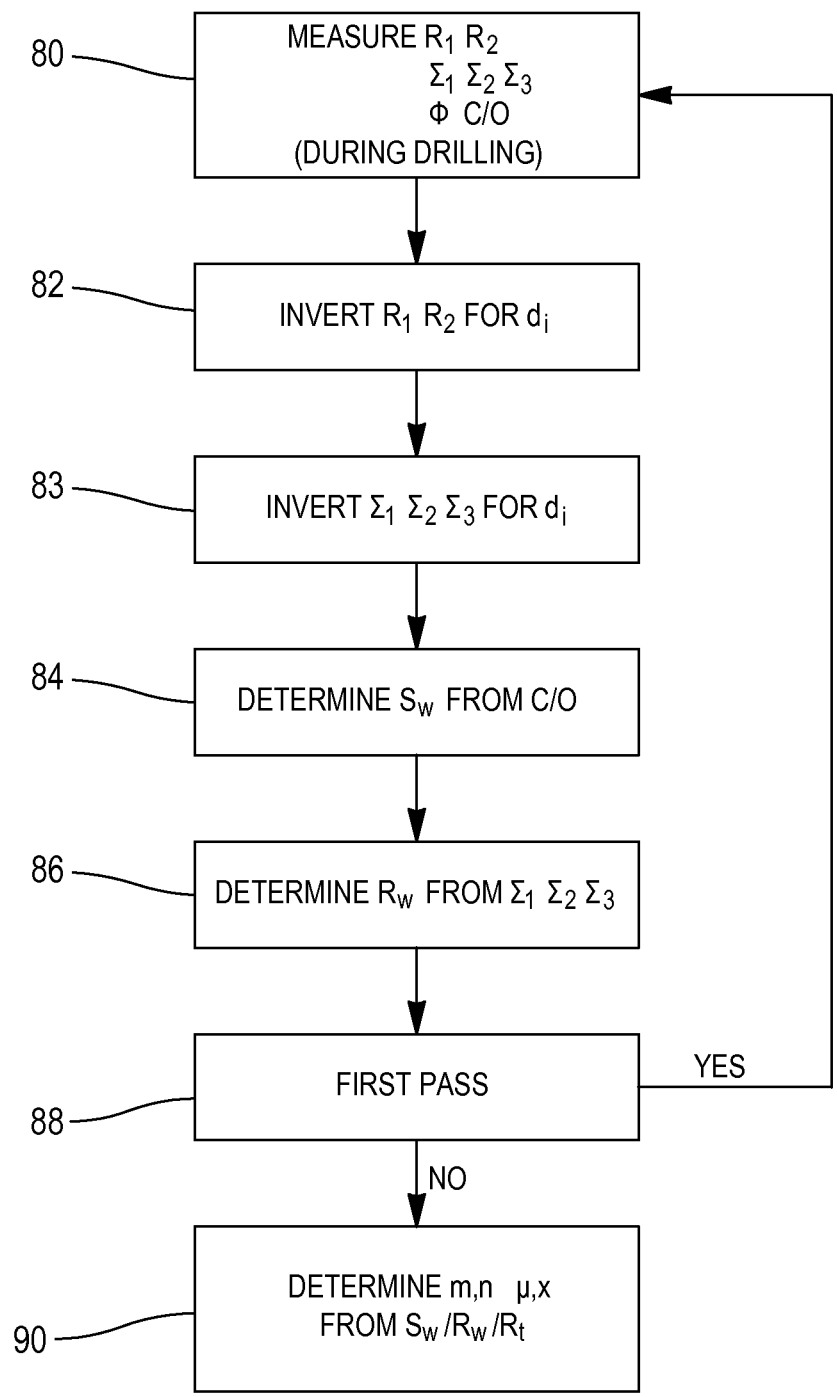
FIG. 4 shows a flowchart of a method of determining water saturation in a subsurface formation according to embodiments of the disclosure

Having explained general terms an example of an instrument used to make measurements for use in the invention, an example method according to the invention will now be explained with reference to FIG. 4. The measurements made by the sub are acquired, in one example during drilling as shown at 80. At 82, a first element of the method is to process the plurality of resistivity measurements to determine the depth of invasion ($d_i$ in FIG. 2). Such processing may include inversion, wherein an initial model of resistivity distribution is generated, an expected (forward) response of the resistivity sensors (64 in FIG. 3) is produced for such model, and the model is adjusted and the forward response is recalculated until the forward response matches the measurements made in the wellbore to within a selected tolerance. Invasion is initially assumed to be less than the depth of investigation of the deepest reading measurement of the GEOVISION instrument, e.g., about 7 inches. Such assumption may be reasonable if the measurements are made during drilling of the wellbore. Salinity of the connate water in the flushed zone, the invaded zone and the uninvaded zone are not required as input for the invasion depth determination. The foregoing procedure should provide an estimated lateral invasion profile that can be used in the interpretation of thermal neutron capture cross section and carbon/oxygen ("C/O") measurements.

At 83, in the next element of the process, the thermal neutron capture cross section measurements can be processed to determine whether invasion is so shallow as to have insufficiently affected the resistivity measurements and/or to cross-check the invasion profile determined from the resistivity measurements. As in the previous process element using resistivity measurements, the capture cross section invasion profile ($\Sigma_f$, $\Sigma_i$, $E_{xo}$ and $d_i$) can be determined by inversion processing. Also as in the previous process element, determining the capture cross section invasion profile can be performed directly from the thermal neutron capture cross section measurements without the need to obtain a value of connate water salinity at this stage in the process. It is contemplated that any well logging instrument used to perform the present method should make thermal neutron capture cross section measurements at least two, and preferably three different lateral depths of investigation. The ECOSCOPE instrument referred to above has such capability.

It is contemplated that the response of the C/O measurement with respect to fluid saturation and porosity would have been fully characterized prior to using the C/O measurements in the present method, that is, the C/O response for various radial invasion and 2D saturation profiles should be determined beforehand. Thus, by using the C/O measurements and the radial invasion profile determined using the resistivity and/or capture cross section measurements as explained above, an estimate of $S_w$ in the uninvaded zone (44 in FIG. 2) may be made from the C/O measurements. Such estimation is shown in the flow chart at 84. It is contemplated that making such estimate is applicable to situations where the invasion is determined to be relatively shallow (e.g., less than about 4 inches). If the invasion is determined to be beyond about 6 inches, the C/O estimation of $S_w$ can still be applied, but values thus determined should be identified in the data record as being measurements from the invaded zone and flushed zone (40 and 42 in FIG. 2).

Carbon and oxygen measurements made by the sub (10 in FIG. 1) may be used to determine water saturation in carbonate formations, including limestone, dolomite, and mixtures thereof according to the expression:

$$\frac{C}{O} = \frac{(1-\phi)\rho_{matrix}/((1-X)M_{CaCO3} + XM_{MgCO3}) + \phi S_O \rho_{oil}/M_{oil} + \phi S_G \rho_{gas}/M_{CH4}}{3(1-\phi)\rho_{matrix}/((1-X)M_{CaCO3} + XM_{MgCO3}) + \phi S_w \rho_{brine} X_{H2O}/M_{H2O}}$$

where M represents the molecular weight of certain constituents of the formation, inkling limestone (calcium carbonate) $M_{CaCO3}$=100, dolomite (magnesium carbonate) $M_{MgCO3}$=75.8, an estimated value for oil, $M_{oil}$~14, methane (for natural gas) $M_{CH4}$=16 and for water $M_{H2O}$=18.

The matrix (rock grain) density $\rho_{matrix}$ is related to the amount of magnesium (dolomitization), where the density of limestone is 2.71 gm/cc and dolomite is 2.87 gm/cc. Likewise the brine (connate water) density is related to its salinity X:

$$\rho_{brine} \approx 1+0.5X_{NaCl} \approx 1.5-0.5X_{H2O}$$

In the case where the formation contains no free gas: $S_G$=0 $S_O$=1-$S_w$ and as a result:

$$\frac{C}{O} = \frac{(1-\phi)\rho_{matrix}/((1-X) + 0.758X) + \phi(1-S_w)\rho_{oil}/(M_{oil}/100)}{3(1-\phi)\rho_{matrix}/((1-X) + 0.758X) + \phi S_w \rho_{brine} X_{H2O}/0.16}$$

The porosity and matrix density may be determined from measurements made by the ECOSCOPE instrument, including bulk density, neutron porosity and photoelectric effect.

Next, the formation water salinity in the uninvaded zone (44 in FIG. 2) can be determined from the thermal neutron capture cross section measurements, using $S_w$ determined from the C/O measurements as explained above. The salinity will be related to the volume of water in the pore spaces $[(1-S_w)*\phi]$ and the thermal neutron capture cross section determined by the inversion of the capture cross section measurements as explained above. The salinity thus determined could be compared with an amount of chlorine determine using inelastic gamma ray spectroscopy measurements made as would be done with the ECOSCOPE instrument.

At this point in the process, the quantities $R_t$, $S_w$, and $\phi$ have been determined for the uninvaded zone (44 in FIG. 2). The quantity $S_w$ may be used for determining estimated oil and/or gas in place in a subsurface reservoir, using techniques known in the art. $R_w$ can be determined from an empirical formula relating salinity to resistivity using the salinity determined from thermal neutron capture cross section as explained above. The foregoing is shown at 86 in FIG. 4.

The foregoing quantities $R_t$, $S_w$, $R_w$ and $\phi$ can be used to characterize one equation to determine unknown petrophysical parameters such as the n and m exponents in the Archie equation described above, or the parameters $\mu$ (water connectivity exponent) and $X_w$ (water connectivity index) in the "connectivity equation." The connectivity equation and the foregoing included parameters are described in D. B. Montaron, CONNECTIVITY THEORY—A NEW APPROACH TO MODELING NON-ARCHIE ROCKS, SPWLA 49th Annual Logging Symposium, May 25-28, 2008. The connectivity equation described therein is:

$$R_t = \frac{R'_w}{(S_w\varphi - \chi_w)^\mu}$$

wherein $R_w' = R_w(1-\chi_w)^\mu$

Such first characterization is shown at 88. A second equation can be characterized by repeating the foregoing measurements (resistivity, thermal neutron capture cross section and C/O) and repeating the foregoing process elements after invasion has progressed deeper into the formation. One example of such procedure would be to operate the sub 10 while withdrawing the drill string from the wellbore after drilling has been suspended, or while reinserting the drill string after a certain period has elapsed after drilling. Such procedure may be referred to as "logging while tripping." The two characterized equations can then be solved, as shown at 90, to provide the n and m exponents in the Archie equation described above, or $\mu$ and $X_w$ in the connectivity equation.

A method and apparatus according to the invention may provide quantitative measures of water and hydrocarbon saturation in subsurface rock formations which are difficult to characterize using resistivity and porosity based empirical relationships. A method and apparatus according to the invention may provide such quantitative measures even in instances where the relationships between resistivity, porosity and water saturation vary within a particular formation. It is also possible using methods and apparatus according to the invention without the need to determine salinity or resistivity of connate water in subsurface formations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining water saturation in a subsurface formation, comprising:
   determining an invasion depth in the formation from a plurality of measurements made within a wellbore drilled through the formation, the measurements having different lateral depths of investigation into the formation;
   measuring carbon and oxygen in the formation at a substantially a same longitudinal position as at a position of the determining the invasion depth; and
   using the measured carbon and oxygen and the invasion depth to determine the water saturation in a substantially uninvaded part of the formation.

2. The method of claim 1 wherein the measuring carbon and oxygen and the determining invasion depth are performed during drilling of the wellbore.

3. The method of claim 1 wherein the plurality of measurements comprise thermal neutron capture cross section measurements.

4. The method of claim 3 further comprising determining a water salinity in the uninvaded formation from the thermal neutron capture cross section measurements.

5. The method of claim 1 wherein the plurality of measurements comprise electrical resistivity measurements.

6. The method of claim 5 further comprising determining a connate water resistivity from the salinity.

7. The method of claim 1 further comprising repeating the determining invasion depth, measuring carbon and oxygen and determining water saturation after a selected time, and characterizing a relationship between electrical resistivity and water saturation based on changes in the invasion depth and water saturation.

8. The method of claim 7 wherein the characterizing comprises determining exponents m and n in the equation:

$$R_t = \frac{R_w}{S_w^n / \phi^m}$$

in which $R_t$ is electrical resistivity of the formation, $R_w$ is connate water resistivity, $S_w$ is the fractional volume of formation pore space occupied by the connate water and $\phi$ is fractional volume of rock occupied by the pore space.

9. The method of claim 7 wherein the characterizing comprises determining parameters $\mu$ (water connectivity exponent) and $\chi_w$ (water connectivity index) in the equation:

$$R_t = \frac{R'_w}{(S_w \phi - \chi_w)^\mu}$$

wherein $R'_w = R_w(1-\chi_w)^\mu$, $R_t$ is electrical resistivity of the formation, $R_w$ is connate water resistivity, $S_w$ is the fractional volume of formation pore space occupied by the connate water and $\phi$ is fractional volume of rock occupied by the pore space.

10. The method of claim 5 wherein the resistivity measurements comprise galvanic measurements.

11. The method of claim 5 wherein the resistivity measurements comprise electromagnetic propagation measurements.

12. The method of claim 1 wherein the measuring carbon and oxygen comprises measuring inelastic gamma rays resulting from interaction of neutrons from the source with nuclei in the formation.

13. A well logging instrument, comprising:
a pulsed neutron source disposed within a housing configured to move along a wellbore, the source configured to irradiate formations adjacent to the wellbore;
a plurality of radiation detectors disposed in the housing and configured to detect radiation from the formations resulting from interaction of neutrons from the source with the formations, the radiation detectors configured to detect radiation related to at least thermal neutron capture cross section to at least two different lateral depths into the formations from the wellbore and carbon and oxygen concentrations in the formations; and
a resistivity sensor configured to measure resistivity of the formations to at least two different lateral depths into the formations from the wellbore, the resistivity sensor and the radiation detectors are longitudinally configured to respond to formations having substantially a same depth of invasion.

14. The instrument of claim 13 wherein the resistivity sensor comprises a focused galvanic sensor.

15. The instrument of claim 13 wherein the resistivity sensor comprises an electromagnetic propagation sensor.

16. The instrument of claim 13 wherein the radiation detectors comprise gamma ray detectors configured to be responsive to density of the formations.

17. The instrument of claim 13 wherein the radiation detectors comprise neutron detectors configured to be responsive to hydrogen index of the formations.

18. The instrument of claim 13 wherein the radiation detectors comprise gamma ray detectors configured to be responsive to photoelectric effect of the formations.

19. The instrument of claim 13 wherein the radiation detectors comprise gamma ray detectors configured to be responsive to thermal neutron capture gamma rays.

20. The instrument of claim 13, wherein the resistivity sensor and the radiation detectors are configured so that the resistivity sensor overlap at least partially the radiation detectors in a longitudinal direction of the instrument.

* * * * *